(12) United States Patent
Kuo

(10) Patent No.: US 6,507,604 B1
(45) Date of Patent: Jan. 14, 2003

(54) RAKE RECEIVER FOR CDMA WIRELESS COMMUNICATIONS

(76) Inventor: Wen-Yi Kuo, 107 Rolling Hills Dr., Morganville, NJ (US) 07751

( * ) Notice: Subject to any disclaimer, the term of this patent is extended or adjusted under 35 U.S.C. 154(b) by 0 days.

(21) Appl. No.: 09/652,936

(22) Filed: Aug. 31, 2000

(51) Int. Cl.[7] .................................................. H04K 1/00
(52) U.S. Cl. ...................................... 375/148; 370/342
(58) Field of Search ................................ 375/147, 148; 370/335, 342

(56) References Cited

U.S. PATENT DOCUMENTS 6,067,292 A * 5/2000 Huang et al. ............... 370/342
6,272,167 B1 * 8/2001 Ono ........................... 375/144

* cited by examiner

Primary Examiner—Temesghen Ghebretinsae
(74) Attorney, Agent, or Firm—Mathews, Collins, Shepherd & McKay

(57) ABSTRACT

An apparatus for performance improvement of a digital wireless receiver, having a plurality of signals, has a processing circuit and a weight generation circuit. The processing circuit provides a processed signal, wherein a plurality of weights is applied to a plurality of signals producing a plurality of weighted signals and the plurality of weighted signals are combined to provide the processed signal. In the weight generation circuit the plurality of weights are generated as a function of a conjugate of channel estimate of a corresponding signal of the plurality of signals and a variance of the corresponding signal. A method implementing the present invention is also described.

12 Claims, 5 Drawing Sheets

RAKE RECEIVER FOR CDMA WIRELESS COMMUNICATIONS

FIELD OF THE INVENTION

This invention relates to the field of wireless digital communications, and more particularly to a rake receiver for such signals.

BACKGROUND OF THE INVENTION

Wireless communications facilitates the delivery of information between the transmitter and the receiver without a physical wired connection. Such advantage translates to the freedom of mobility for the users and to the savings of wiring nuisance for the users. However, spectrum has become scarce resource as the usage of wireless communications for various applications becomes more popular. Therefore the efficiency of using spectrum presents challenges for the wireless industry. In order to maximize efficient spectrum utilization, various multiple access methods have been proposed to achieve the goal.

First generation cellular communications systems, Advanced Mobile Phone Services (AMPS) employed the Frequency Division Multiple Access (FDMA) method and provided voice communication services in the early days. Second generation cellular communications systems improved the spectrum efficiency by using more digital processing of signals and employed Time Division Multiple Access (TDMA) method in GSM and IS-136 systems and Code Division Multiple Access (CDMA) method in IS-95 systems. While second generation systems typically provide two to five times voice capacity over the first generation systems, data capabilities of second-generation systems are very limited.

Recent rapid commercial development of Internet and multimedia applications has created a strong demand for wireless cellular systems capable of providing sufficient bandwidth. In addition, further improvement of voice capacity in spectrum efficiency is in great demand as the spectrum allocated for service is very limited. This scarcity results in high licensing fees for the available spectrum.

Therefore there is a strong need to improve the system capacity and spectrum efficiency for wireless communication systems.

SUMMARY OF THE INVENTION

The present invention is an apparatus for performance improvement of a digital wireless receiver having a plurality of signals. The apparatus has a processing circuit and a weight generation circuit. The processing circuit provides a processed signal, wherein a plurality of weights is applied to a plurality of signals producing a plurality of weighted signals and the plurality of weighted signals are combined to provide the processed signal. In the weight generation circuit the plurality of weights are generated as a function of a conjugate of channel estimate of a corresponding signal of the plurality of signals and a variance of the corresponding signal. A method implementing the present invention is also described.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

In wireless communications, radio waves from a transmitter arrive at a receiver via several paths (multipaths) having different path lengths. The receiver combines the radio waves. However, the combining of the radio waves is not performed by coherent addition, as a result of which fading occurs. Various diversity schemes have been proposed to deal with such fading. One example is a rake receiver scheme. Rake reception is a technique, which involves identifying signals that have passed through multipaths and combining the signals (by maximum-ratio combining) upon weighting them for reliability, thereby improving the characteristic.

Digital cellular wireless communication systems using CDMA technology have been developed as next-generation mobile communications systems for implementing wireless Internet and multimedia communication. In such CDMA communication systems, transmission information from a plurality of channels or users is multiplexed by spreading codes that differ from one another and is transmitted via a transmission path such as a wireless link.

CDMA system concepts have been incorporated into the dominant third generation (3G) standards. As the whole wireless industry moves toward 3G development and deployment, CDMA systems are becoming increasingly more popular. Due to the ability to resolve multiple paths, CDMA systems usually employ a rake receiver in the signal reception process. This invention proposes a new architecture that improves the rake receiver design for CDMA systems.

Figure 1A:
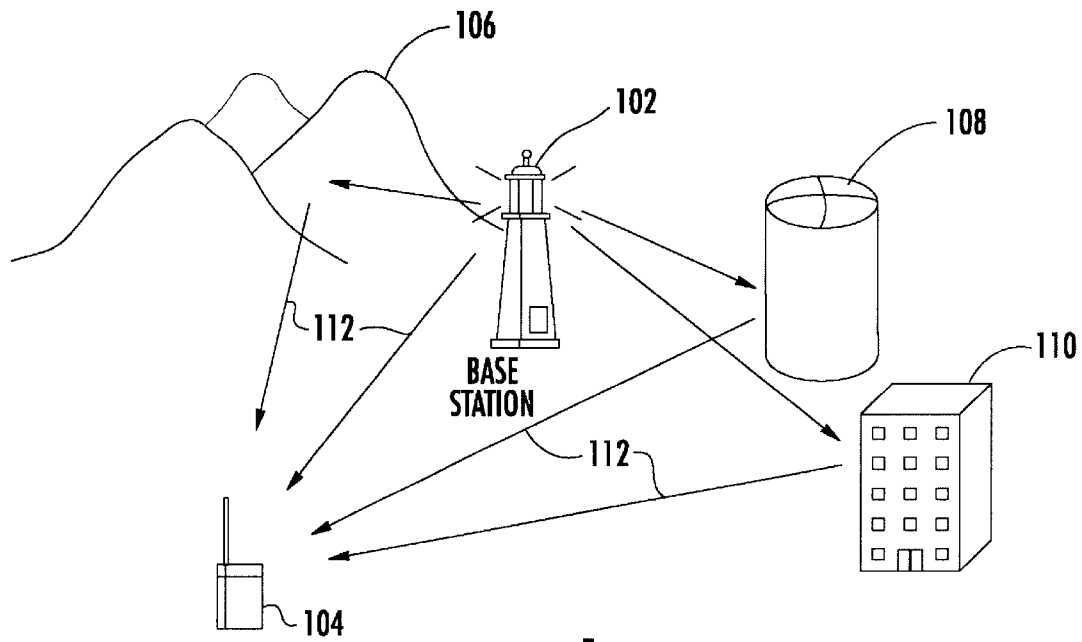
FIG. 1a is a stylized representation of a typical multipath channel model.
Figure 1B:
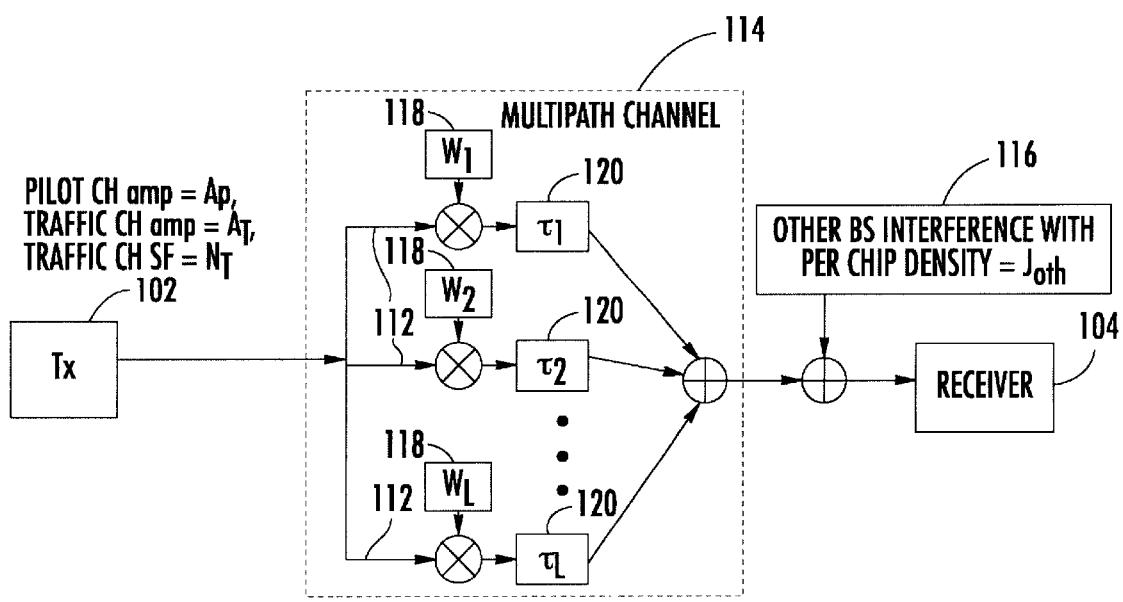
FIG. 1b is a block diagram representation of a typical multipath channel model.

One major advantage of CDMA systems is their efficient usage of wide bandwidth signal. CDMA systems transmit wide bandwidth signal over the air from the transmitter to the receiver. Referring to FIG. 1a there is shown a stylized representation of a typical multipath channel model. A base station 102 transmits a signal to a mobile station 104. A variety of reflecting objects, such as geographical features (mountains, etc.) 106, storage towers (water, gas, oil, etc.) 108, and buildings 110 as well as other objects cause the signal will be split into multiple paths and arrives at the receiver with different delay. Typically, each transmission path 112 has different length and different reflection condition and thus yields different delay and different channel attenuation in both the signal amplitude and phase rotation. Referring to FIG. 1b there is shown a block diagram representation of a typical multipath channel model. A base station 102 transmits a signal comprised of $A_P$ (pilot CH amp), $A_T$ (Traffic CH amp), and $N_T$ (traffic CH SF). The transmitted signal follows a multipath channel 114, which is comprised of various transmission paths 112. Other base station interference 116 combines with the multipath channel signal and is received by the mobile station 104. Each transmission path gives the signal a different complex gain $(w_1)$ 118 (signal strength) and a different corresponding delay 120 $(\tau_1, \tau_2 \ldots \tau_l \ldots \tau_L)$.

The wide bandwidth that CDMA signal transmits helps resolve transmission path ambiguity and materializes the detection of signal at different paths. CDMA systems, such as the mobile receiver 104, therefore, incorporate a rake receiver to combine the signals from different paths. The rake receiver is usually equipped with several fingers with each finger demodulating and decoding the signal at a path with different delay. The rake receiver uses a soft combination of signals from different fingers to "rake" the received signal and reconstruct the transmitted signal. The "soft" combination at a rake receiver presents the intrinsic diversity gain spread over different paths. The rake receiver is thus one of the most critical subsystems in CDMA communication systems.

Figure 2:
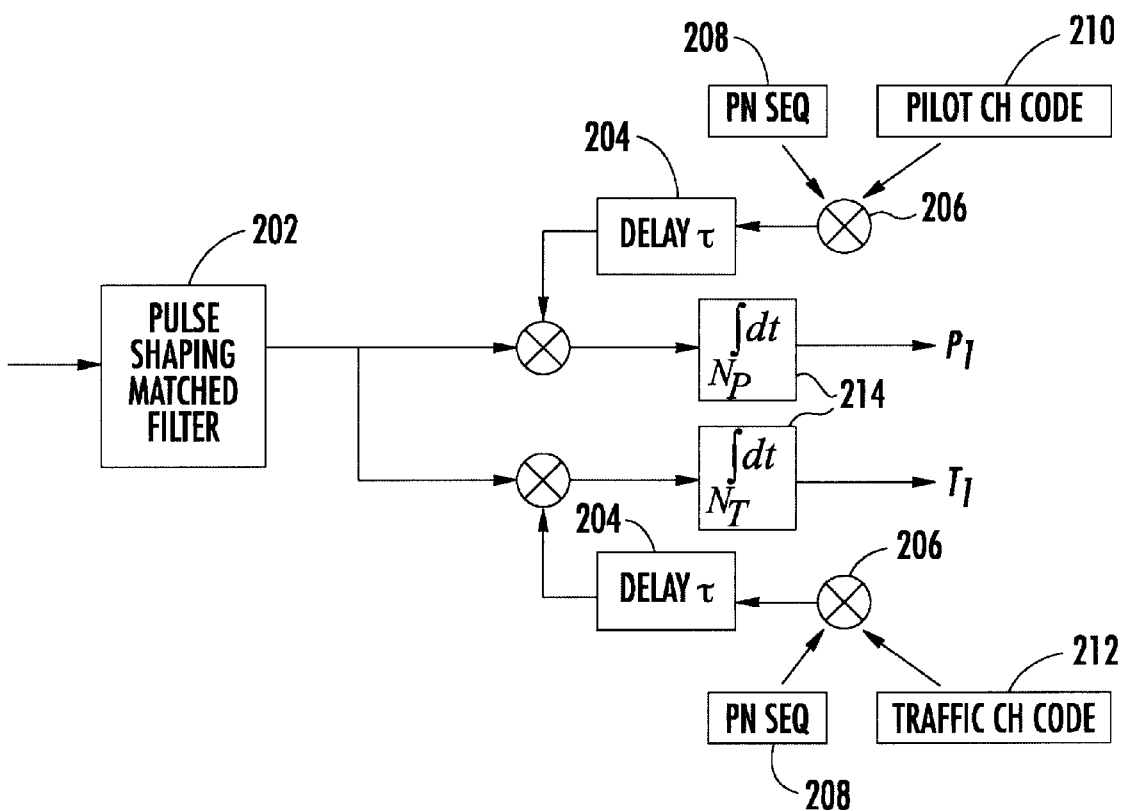
FIG. 2 is a block diagram of the rake receiver processing at each finger.

For mobile communication systems, channel fading can rapidly change, therefore the usual practice for CDMA systems is to utilize pilot signals (i.e., known signal or training sequence either in the form of pilot code channel(s) or pilot symbols) transmitted together with the traffic signals. The rake receiver detects the pilot signal and provides the channel estimate at each finger. Referring to FIG. 2 there is shown a block diagram of the rake receiver processing at each finger. The received signal after the matched filter 202 (matched to the transmitted pulse shaping), is then de-spread with a hypothesized delay τ 204. A typical de-spread operation is a multiplication 206 with the product of the PN sequence 208 (which is associated with the transmit base station and the user) and the specific channel orthogonal code (i.e., code for pilot code channel 210 or traffic code channel 212), then followed by an integration 214 over certain period. The hypothesized delay τ is unique to each finger so that multiple fingers are set up to capture the signal at multiple paths. The integration period for traffic channel is the symbol duration in the traffic channel and the integration period for pilot channel depends on the channel variation speed or the vehicular speed. The result of the integration at the $l^{th}$ finger is a pilot signal $P_l$ and a traffic signal $T_l$.

The PN sequence is the pseudo random sequence. The sequence can be generated by a shift register with some binary add operations so the output sequence appears random. However, as long as the receiver knows the seed for the register and timing, it can re-generate the sequence. By correlating the received sequence with re-generated sequence, only the desired signal will have a large gain (called spreading gain) and suppress the interference.

The prior art of soft combining at rake receiver is to simply weight the signals from different paths by the associated finger's conjugate of channel estimate. A conjugate is to de-rotate the phase while reserving the amplitude. Denote the complex output (with I+jQ format where I is the in-phase component and Q is the quadrature phase component) of the de-spreader at the $l^{th}$ path for the traffic channel and pilot channel, as $T_l$ and $P_l$, respectively. Thus, prior art of soft combining at rake receiver performs the following operation $$D = \sum_{l=1}^{L} \text{Re}[T_l P_l^*] \qquad \text{Eq. 1}$$

where L is the total number of paths, D is the decision variable with D>0 in favor of −1 transmitted and D<0 in favor of −1 transmitted, * denotes the conjugate operation, and Re[x] is an operation taking the real part of x. However, this approach does not yield the optimal performance.

The present invention provides an improved architecture in which the signals from different paths are weighted by the associated finger's conjugate of channel estimate and inversely weighted by the associated fingers' variance.

Compared to the prior art described by Eq. 1, the operation of the soft combining of the present invention scheme is as follows:

$$D = \sum_{l=1}^{L} \frac{\text{Re}[T_l P_l^*]}{V_l} \qquad \text{Eq. 2}$$

where $$V_l = E\lfloor |T_l - E[T_l]|^2 \rfloor \text{ or } V_l = E\lfloor |P_l - E[P_l]|^2 \rfloor \qquad \text{Eq. 3}$$

E[ ] is the expectation operation which will take the mean out of the random variable inside [ ]. The finger variance, $V_l$, can be estimated via the de-spreader output of traffic channel or pilot channel. As the pilot channel provides the complete known signal it is thus easier to use pilot channel de-spreader output to estimate the finger variance. There can be many ways of implementation for that. One embodiment is to obtain the mean of $P_l$ over the operation duration and then calculate the variance based on that. Mathematically, it can be formulated as follows:

$$E[P_l] = \sum_{t=t_0}^{t_1} P_l(t) \qquad \text{Eq. 4}$$

$$V_l = \sum_{t=t_0}^{t_1} |P_l(t) - E[P_l]|^2$$

$$D = \sum_{l=1}^{L} \frac{\text{Re}[T_l (E[P_l])^*]}{V_l}$$

where $P_l(t)$ is the output of the de-spreader of pilot channel at time instant t. The sampling period and duration for the operation ($t_0$ to $t_1$) depends on the channel variation speed or the vehicular speed.

Figure 3A:
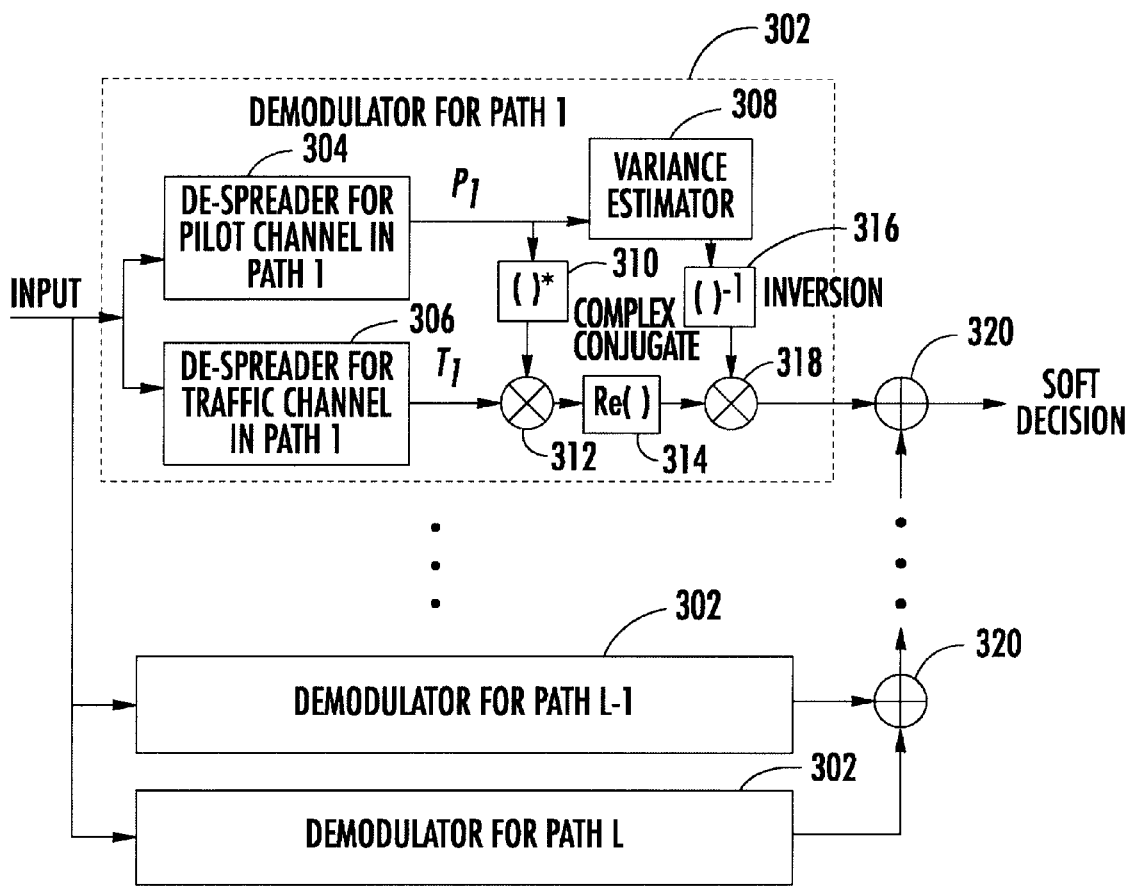
FIGS. 3a and 3b are a block diagram representation of the resultant rake receiver; and, FIG. 4 is a graphical representation of bit error rate vs. the traffic power fraction for two test case comparison.
Figure 3B:
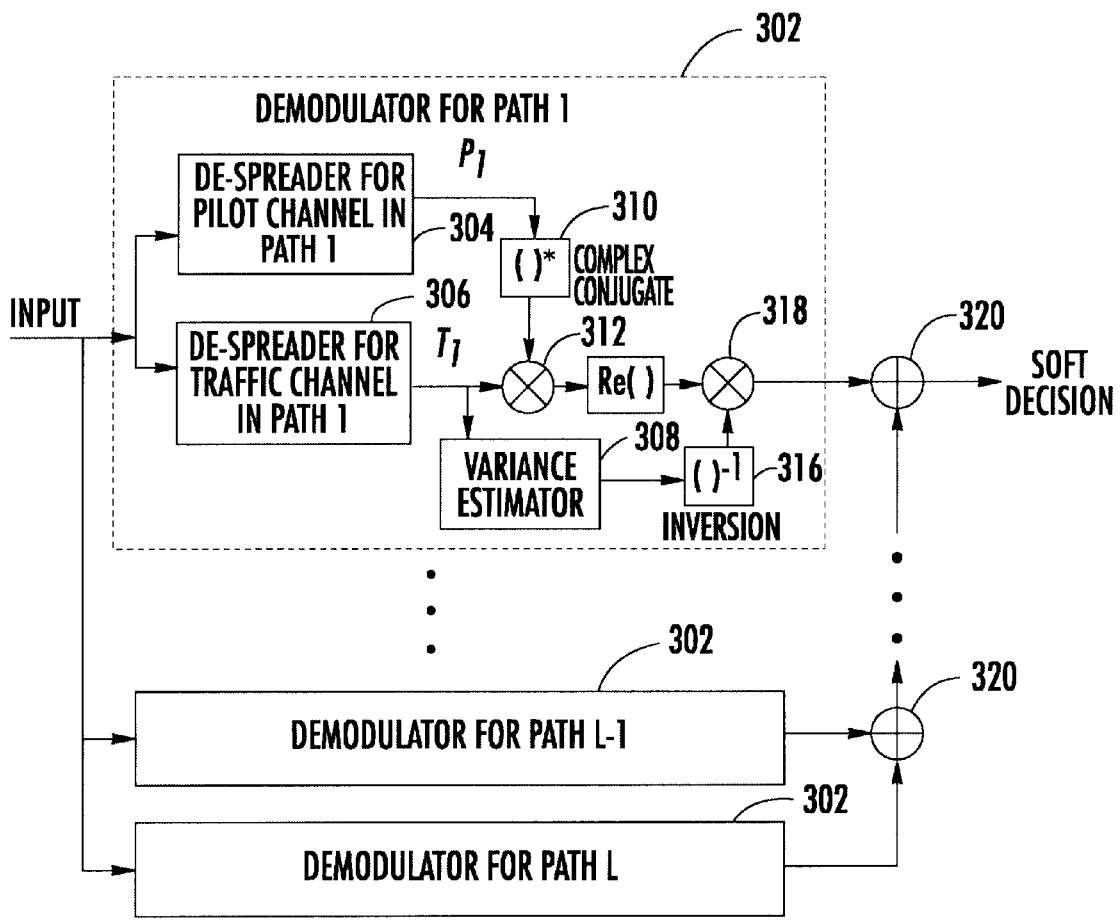

Referring to FIGS. 3a and 3b there are shown block diagram representations of the resultant rake receiver. The pilot channel can be the pilot code channel or the pilot symbols. The architecture of the present invention is equally well suited for application to a rake receiver of any CDMA systems. The received signal is processed by a corresponding demodulator 302 for each transmission path 1 through L. The demodulator 302 for path l contains a de-spreader for the pilot channel 304 in path l and a de-spreader for the traffic channel 306 in the path l. In one embodiment, represented by FIG. 3a, a variance estimator 308 is coupled to the output of the de-spreader for the pilot channel 304, while in another embodiment, represented by FIG. 3b, a variance estimator 308 is coupled to the output of the de-spreader for the traffic channel 306. A complex conjugate function 310 is coupled to the output of the de-spreader for the pilot channel 304. The output of the de-spreader for the traffic channel 306 and the output of the complex conjugate function 310 are input to multiplier 312. Function Re[x] 314, which is an operation taking the real part of x, is coupled to the output of multiplier 312. An inversion function 316 is coupled to the output of variance estimator 308. The output of the inversion function 316 and the output of function Re[x] are coupled to the inputs of multiplier 318. The output of multiplier 318 is coupled to adder 320. Corresponding adders 320 combine the corresponding outputs of the demodulators for paths 1 through L.

Analytical evaluation of the present invention shows performance improvement for various cases. In general, larger gain of the present invention's architecture can be obtained if the mobile station is located in a "better" location (i.e., higher geometry, or closer to the serving base station(s) in the sense of radio distance). Traditionally this was not critical as the voice channel power needed (from base stations) in such locations are very low and saving 1 dB is not making much advantage. This is because the voice channel has lower bit rate and therefore higher spreading gain, e.g., 512 in WCDMA. However, as data becomes the more dominant application, higher channel rates are of high demand and therefore saving up to 0.9 dB at the high geometry locations will make a significant difference. For instance, for channels of spreading factor equal to 16 or less (e.g., channel rates of 480 Kbps or higher in WCDMA), the saving in base station transmit power fraction can easily translate into a significant capacity increase.

Although, the illustrative embodiment above is for the downlink of a CDMA system, the present invention is equally well suited for use with the uplink of any CDMA system. In particular, in a CDMA uplink, if a data user wants to use high channel rate to transmit, it usually is allowed only when the loading level (i.e., the utilization at that cell) in the uplink is light. In that case, it is exactly the same situation as a high geometry user (i.e., relative other cell interference is low) and therefore the present invention provides significant gain for the CDMA uplink usage as well.

Referring back to FIG. 2 there can been seen the correlator operation at each finger. Without loss of generality, the output of the PN and orthogonal modulation correlator for the traffic channel and pilot channel in the $l^{th}$ path can be formulated respectively as $$T_l = x \cdot w_l N_T A_T(l) + y(T,l) \quad \text{Eq. 5}$$

$$P_l = w_l N_P A_P(l) + y(P,l) \quad \text{Eq. 6}$$

where x is the transmitted binary symbol, i.e., ±1

$w_l$ is the complex-valued short term fading (namely, multiplicative distortion, MD) for the $l^{th}$ path, $N_T$ is the traffic channel integration period in chips, i.e., the spreading factor (chips per symbol)

$N_P$ is the pilot channel integration period in chips (to yield a channel estimate), $A_T(l)$ and $A_P(l)$ are the amplitudes of the traffic channel and pilot channel in the $l^{th}$ path (for full rate), respectively, and they include transmit power for the specified channel, path loss, shadow fading, and antenna gain, but it does not include the short term fading, y(T,l) and y(P,l) are the interference of the traffic channel and pilot channel in the $l^{th}$ path, respectively.

The multiplicative distortion at each path is assumed to be Rayleigh (i.e., each $w_l$ is a complex Gaussian with zero mean), independent and the sum of the average power among multiple paths is normalized to 1, i.e., $$\sum_{l=1}^{L} E[|w_l|^2] = 1 \quad \text{Eq. 7}$$

$$E[w_l w_n^*] = 0, \text{ if } n \neq l$$

The interference at the traffic channel and pilot channel are assumed to be zero mean and independent and has the following properties $$E[|y(T,l)|^2] = N_T J(l), \; E[|y(P,l)|^2] = N_P J(l) \quad \text{Eq. 8}$$

$$J(l) = J_{oth} + \sum_{\substack{l=1 \\ n \neq l}}^{L} E[|w_n|^2]$$

$$[y(T,n)y(P,l)^*] = 0 = E[y(T,l)] = E[y(P,l)]$$
$$[y(T,n)y(T,l)^*] = [y(P,n)y(P,l)^*] = 0, \text{ if } n \neq l$$

where

J(l) is the per chip interference, i.e., the interference density in the $l^{th}$ path, $J_{oth}$ is the variance of the interference from other base stations' transmission, $$\sum_{\substack{l=1 \\ n \neq l}}^{L} E[|w_n|^2]$$

station).

The bit error rate for the decision metric in equation 2 can be evaluated as follows:

$$\text{BER} = \text{Prob}\{D < 0 \mid x = 1\} = \quad \text{Eq. 9}$$

$$\text{Prob}\left\{\sum_{l=1}^{L} \frac{\text{Re}[T_l P_l^*]}{V_l} < 0 \;\middle|\; x = 1\right\} = \text{Prob}\{Z^H Q Z < 0 \mid x = 1\}$$

where $$Z = [P_1 \; P_2 \; \ldots \; P_L T_1 \; T_2 \; \ldots \; T_L]^T, \; Q = \begin{bmatrix} 0_L & V^{-1} \\ V^{-1} & 0_L \end{bmatrix} \quad \text{Eq. 10}$$

$$V = \text{diag}([V_1 \; V_2 \; \ldots \; V_L])$$

$0_L$ is an L×L all-zero matrix.

Equation 9 has been explicitly solved by previous research. In general, the characteristic function together with residue methodology provides good solutions to equation 9 as follows:

$$\text{Prob}\{Z^H Q Z < 0\} = \quad \text{Eq. 11}$$

$$\frac{1}{2\pi j} \int_{s=\sigma-j\infty}^{\sigma+j\infty} \frac{\phi(s)}{s} ds = \begin{cases} -\sum_{\text{right plane poles}} \text{Residue}\left[\frac{\phi(s)}{s}\right] \\ \sum_{\text{left plane poles} \cup \{0\}} \text{Residue}\left[\frac{\phi(s)}{s}\right] \end{cases}$$

where $0 < \sigma <$ real part of the first right plane pole of $\phi(s)$, and $\phi(s)$ is the characteristic function of the decision metric $D = Z^H Q Z$, $$\phi(s) = E[e^{-sD}] = \quad \text{Eq. 12}$$

$$\frac{1}{\det(I + sC_z Q)} \exp(-E[Z]^H C_z^{-1}[I - (I + sC_z Q)^{-1}] E[Z])$$

where $$C_z = E[(Z - E[Z])(Z - E[Z])^H] \quad \text{Eq. 13}$$

and the components of $C_z$ can be obtained as follows:

$$E[P_n P_l^*] = \delta(n-l)\{E[|w_l|^2] N_P^2 A_P^2(l) + N_P V_l\} \equiv a_l$$

$$E[T_n T_l^*] = \delta(n-l)\{E[|w_l|^2]N_T^2 A_T^2(l) + N_T V_l\} \equiv b_l$$

$$E[P_n T_l^*] = \delta(n-l)\{E[|w_l|^2]N_T N_p A_T(l) A_P(l)\} \equiv c_l \quad \text{Eq. 14}$$

Since the channel is assumed to be Rayleigh faded, so $E[Z]=0$. The determinant term in equation 12 can be explicitly expressed as $$det(I + sC_zQ) = det\left(I_{2L} + s\begin{bmatrix}\Lambda_a & \Lambda_c \\ \Lambda_c & \Lambda_b\end{bmatrix}\begin{bmatrix}0_L & V^{-1} \\ V^{-1} & 0_L\end{bmatrix}\right) = \quad \text{Eq. 15}$$

$$det((I_L + s\Lambda_c V^{-1})^2) - det(s^2\Lambda_a\Lambda_b V^{-2}) =$$

$$\prod_{l=1}^{L}\left(1 + s\frac{2c_l}{V_l} + s^2 c_l^2 - \frac{a_l b_l}{V_l^2}\right)$$

where $\Lambda_a = \text{diag}([a_1\ a_2\ \ldots\ a_L])$ $\Lambda_b = \text{diag}([b_1\ b_2\ \ldots\ b_L])$ $\Lambda_c = \text{diag}([c_1\ c_2\ \ldots\ c_L])$ \quad Eq. 16

The invention may now be better understood by consideration of the following specific examples and tests. In the examples and tests, which are intended for those skilled in the art, the acronyms used are expanded when they are first used and in the definitions section at the end of this application. The following examples are provided for the purpose of illustration only. The examples should not be construed as limiting the invention.

EXAMPLE

This example is to demonstrate this invention's feasibility. The experimental detail combined with the description above shows advantages of various possible components and methods.

In order to evaluate the performance improvement by using the weights accounting for the finger variance, two test cases are set up to compare the performance. The benchmark case is to have matrix V in Eq. 10 equal to an identity matrix. This represents the case not using the finger variance, which is the implementation of the traditional rake receiver. The test case is to have matrix V in Eq. 10 equal to $J=\text{diag}([J(1)\ J(2)\ \ldots\ J(L)])$ which represents the implementation using the information of finger variance estimate.

Note that $$V_l = E\left[\left|T_l - E[T_l|x, \hat{A}_T(l), \hat{A}_p(l)]\right|^2\right] \quad \text{Eq. 17}$$

$$= E[|w_l|^2]\left(N_T A_T(l) - N_T \hat{A}_T(l)\frac{A_p(l)}{\hat{A}_p(l)}\right)^2 + N_T\left(1 + \frac{N_T \hat{A}_T^2(l)}{N_p \hat{A}_p^2(l)}\right)J(l)$$

where $\hat{A}_T(l)$ is the estimate of $A_T(l)$ and $\hat{A}_p(l)$ is the estimate of $A_p(l)$. At high SNR for pilot channels (for instance, using long enough integration period, Np, or good enough amplitude, Ap), the channel variance in the $l^{th}$ path can be approximated as $$N_T\left(1 + \frac{N_T \hat{A}_T^2(l)}{N_p \hat{A}_p^2(l)}\right)J(l).$$

Removing the coefficients not variable to different paths and using the fact that traffic to pilot ratio is the same for all paths, it is found that $V_l$ is proportional to $J(l)$. In summary, the two test cases that are compared are:

Benchmark: $V=I$ (Traditional Rake Receiver)

Proposed: $V=J=\text{diag}([J(1)\ J(2)\ \ldots\ J(L)])$ \quad Eq. 18

Figure 4:
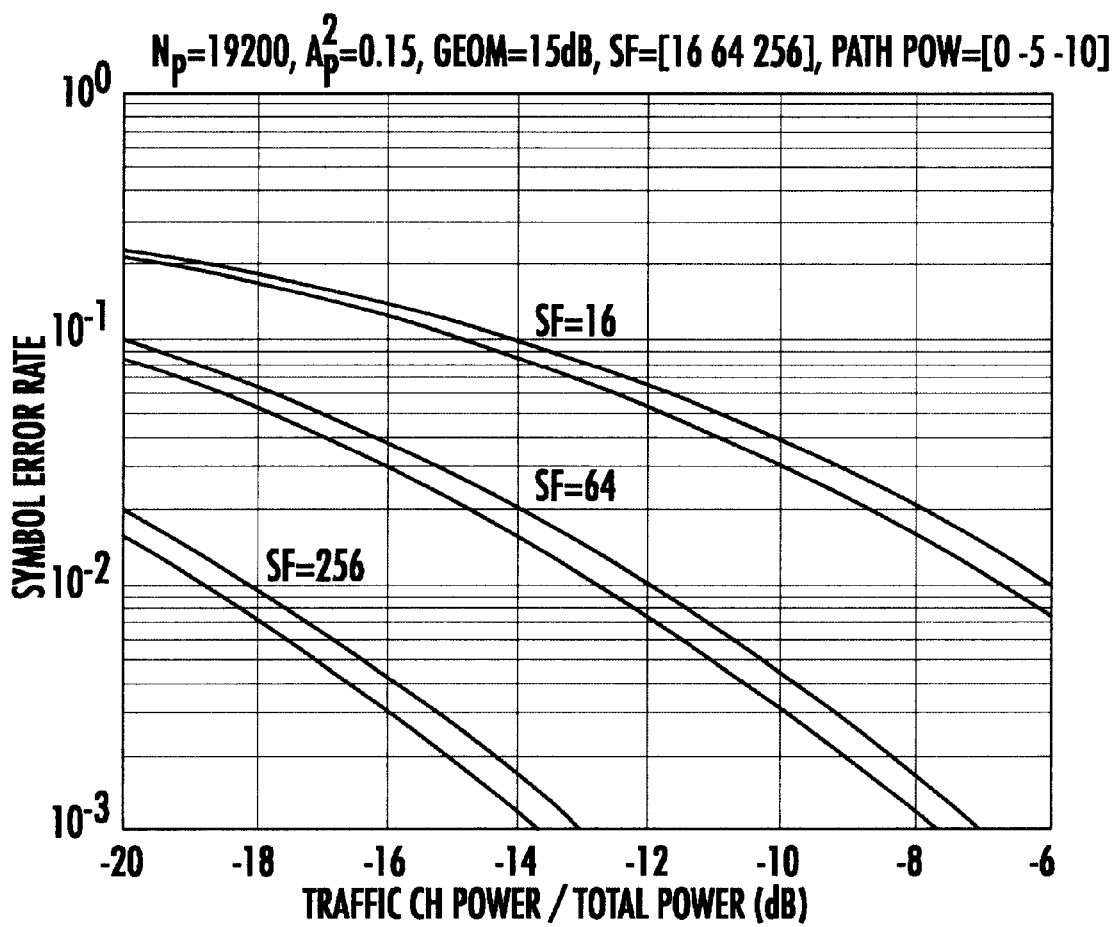

FIG. 4 is a graphical representation which shows the bit error rate vs. the traffic power fraction for the two cases in comparison. The abscissa is the traffic channel power to total power ratio at the transmitter, usually phrased as traffic power fraction. The ordinate is the symbol error rate, which is the bit error rate without channel coding. A pilot integration period, Np, of 19200 chips is used and 15% of total power from the base stations is assumed used for pilot channel ($A_p^2=0.15$). Geometry is an indicator of how far away (in terms of propagation loss and shadow fade, or "radio distance") the mobile station is located from the serving base station and is defined as $$\text{Geometry} = \frac{\text{Recieved Serving BS Power}}{\text{All Other Power}} \approx \frac{\sum_{n=1}^{L}E[|w_l|^2]}{J_{oth}} \quad \text{Eq. 19}$$

where the power is defined at the mobile antenna input. Note that the right most part of Eq. 19 is in reference to FIG. 1, Eq. 7 and Eq. 8. Also note that the power received at the mobile station from neighboring base stations contribute the most to the denominator of Eq. 19. Therefore a higher value of geometry indicates the mobile station is closer to the serving base station (in radio distance) and vice versa. Geometry of 15 dB is used in FIG. 4 to represent a case where the mobile station is close to the base station. Spreading factors, SF, i.e., the $N_T$ in Eq. 5, of 16, 64 and 256 are evaluated in FIG. 4. A multipath power profile of [0–5–10] dB is used where the three paths are assumed at least two2 chips away. The result is plotted in solid lines for the traditional rake (V=I) and in dashed lines for the test case (V=J). A 0.9 dB gain is obtained by using the present invention's architecture compared to that of a traditional rake.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claim, is reserved.

For example, although the inventive concept was illustrated herein as being implemented with discrete functional building blocks, e.g., a weight generation circuit, the functions of any one or more of those building blocks can be carried out using one or more appropriately programmed processors, e.g., a digital signal processor. It should be noted that the inventive concept is also applicable to other wireless systems (not just CDMA).

What is claimed is:

1. A method for performance improvement of a digital wireless rake receiver having a plurality of finger signals comprising the following steps:

determining a corresponding conjugate of channel estimate for each finger signal of the plurality of finger signals;

determining a corresponding variance for said each finger signal of the plurality of finger signals, said corresponding variance is $V_l = E[|P_l - E[P_l]|^2]$ where $V_l$ is the variance, E is the expectation operation and $P_l$ is de-spreader output at an $l^{th}$ path for pilot channel;

generating a plurality of weights wherein weights are generated as a function of said corresponding conjugate of channel estimate and said corresponding variance;

applying said plurality of weights to the plurality of finger signals producing a plurality of weighted signals; and, combining said plurality of weighted signals producing a processed signal.

2. The method as recited in claim 1 wherein the pilot channel comprises a pilot code channel.

3. The method as recited in claim 1 wherein the pilot channel comprises pilot symbols.

4. A method for performance improvement of a digital wireless rake receiver having a plurality of finger signals comprising the following steps:

determining a corresponding conjugate of channel estimate for each finger signal of the plurality of finger signals;

determining a corresponding variance for said each finger signal of the plurality of finger signals said corresponding variance is $V_l = E[|T_l - E[T_l]|^2]$ where $V_l$ is the variance, E is the expectation operation, and $T_l$ is de-spreader output at an $l^{th}$ path for traffic channel;

generating a plurality of weights wherein weights are generated as a function of said corresponding conjugate of channel estimate and said corresponding variance;

applying said plurality of weights to the plurality of finger signals producing a plurality of weighted signals; and, combining said plurality of weighted signals producing a processed signal.

5. An apparatus for performance improvement of a digital wireless rake receiver having a plurality of finger signals comprising:

a processing circuit for processing the plurality of finger signals and providing a processed signal, wherein a plurality of weights is applied to said plurality of finger signals producing a plurality of weighted signals and said plurality of weighted signals are combined to provide said processed signal; and a weight generation circuit for generating said plurality of weights, wherein said plurality of weights are generated as a function of a conjugate of channel estimate of a corresponding finger signal of said plurality of finger signals and a variance of said corresponding finger signal;

wherein said variance of said corresponding finger signal is $V_l = E[|P_l - E[P_l]|^2]$ where $V_l$ is the variance, E is the expectation operation and $P_l$ is de-spreader output at an $l^{th}$ path for pilot channel.

6. The apparatus as recited in claim 5 wherein said pilot channel comprises a pilot code channel.

7. The apparatus as recited in claim 5 wherein said pilot channel comprises pilot symbols.

8. An apparatus for performance improvement of a digital wireless rake receiver having a plurality of finger signals comprising:

a processing circuit for processing the plurality of finger signals and providing a processed signal, wherein a plurality of weights is applied to said plurality of finger signals producing a plurality of weighted signals and said plurality of weighted signals are combined to provide said processed signal; and a weight generation circuit for generating said plurality of weights, wherein said plurality of weights are generated as a function of a conjugate of channel estimate of a corresponding finger signal of said plurality of finger signals and a variance of said corresponding finger signal;

wherein said variance of said corresponding finger signal is $V_l = E[|T_l - E[T_l]|^2]$ where $V_l$ is the variance, E is the expectation operation and $T_l$ is de-spreader output at an $l^{th}$ path for traffic channel.

9. A signal processor for a wireless receiver having a plurality of signals, the signal processor comprising:

a processing circuit for processing the plurality of signals and providing a processed signal, wherein a plurality of weights is applied to the plurality of signals producing a plurality of weighted signals and said plurality of weighted signals are combined to provide said processed signal; and a weight generation circuit for generating said plurality of weights, wherein said plurality of weights are generated as a function of a conjugate of channel estimate of a corresponding signal of said plurality of signals and a variance of said corresponding signal;

wherein said variance of said corresponding signal is $V_l = E[|P_l - E[P_l]|^2]$ where $V_l$ is the variance, E is the expectation operation and $P_l$ is de-spreader output at an $l^{th}$ path for pilot channel.

10. The signal processor as recited in claim 9 wherein said pilot channel comprises a pilot code channel.

11. The signal processor as recited in claim 9 wherein said pilot channel comprises pilot symbols.

12. A signal processor for a wireless receiver having a plurality of signals, the signal processor comprising:

a processing circuit for processing the plurality of signals and providing a processed signal, wherein a plurality of weights is applied to the plurality of signals producing a plurality of weighted signals and said plurality of weighted signals are combined to provide said processed signal; and a weight generation circuit for generating said plurality of weights, wherein said plurality of weights are generated as a function of a conjugate of channel estimate of a corresponding signal of said plurality of signals and a variance of said corresponding signal;

wherein said variance of said corresponding signal is $V_l = E[|T_l - E[T_l]|^2]$ where $V_l$ is the variance, E is the expectation operation and $T_l$ is de-spreader output at an $l^{th}$ path for traffic channel.

* * * * *